US012724701B1

(12) United States Patent
Ruslan et al.

(10) Patent No.: US 12,724,701 B1
(45) Date of Patent: Sep. 1, 2026

(54) CLOUD BASED TEST DATA MANAGEMENT

(71) Applicant: Fannie Mae, Washington, DC (US)

(72) Inventors: Bliznyuk Ruslan, Lancaster, PA (US); Zhou Dingbo, Potomac, MD (US); Milicevic Lazar, Bethesda, MD (US); Daniel Holstein, Washington, DC (US); Daniel Seeley, Glen Allen, VA (US)

(73) Assignee: FANNIE MAE, Washington, DC (US)

( * ) Notice: Subject to any disclaimer, the term of this patent is extended or adjusted under 35 U.S.C. 154(b) by 169 days.

(21) Appl. No.: 18/343,201

(22) Filed: Jun. 28, 2023

(51) Int. Cl.
*G06F 11/3668* (2025.01)
*G06F 21/60* (2013.01)

(52) U.S. Cl.
CPC ........ *G06F 11/3688* (2013.01); *G06F 21/602* (2013.01); *G06F 21/606* (2013.01)

(58) Field of Classification Search
CPC .......................... G06F 11/3688; G06F 21/602
See application file for complete search history.

(56) References Cited

U.S. PATENT DOCUMENTS 10,339,038 B1 * 7/2019 Singh .................. G06F 11/3684
11,790,106 B1 * 10/2023 Stapleton ................ G06F 21/64
2007/0136576 A1 * 6/2007 Chambers ............... G06F 21/85 711/E12.102
2015/0143064 A1 * 5/2015 Bhargava ............ G06F 11/1464 711/162
2017/0004314 A1 * 1/2017 Blumenau ........... G06F 21/6218
2020/0150953 A1 * 5/2020 Smith .................. G06F 21/602
2020/0177562 A1 * 6/2020 Tav ......................... G06F 21/62
2021/0049299 A1 * 2/2021 Pacella ................. H04L 9/0897
2021/0173945 A1 * 6/2021 Karr ...................... G06F 21/602
2023/0028339 A1 * 1/2023 Sloane ................ G06F 11/3688
2023/0409722 A1 * 12/2023 Rothschild ............ G06F 21/602
2025/0307450 A1 * 10/2025 DeWispelare ...... G06F 21/6245

* cited by examiner

*Primary Examiner* — Wei Y Mui
*Assistant Examiner* — Brahim Bourzik
(74) *Attorney, Agent, or Firm* — Michael Best & Friedrich LLP

(57) ABSTRACT

A test data management platform consistent with at least one embodiment of this disclosure is configured to provide both scheduled and on-demand automated secure data delivery in a cloud native services environment. Various dataset delivery is provided including but not limited to masked and subset datasets. Additionally, the platform is configured to allow user and developer access, particularly in a continuous integration and deployment environment. Still further, the platform interfaces with production data to provision different types of lower environment data, including production-to-lower environment with and without masking, and lower-to-lower environment with and without masking. Additionally, the platform implements security and control features including data governance, data encryption, data masking using security-approved algorithms, logging and monitoring, auditing, scanning credentials, and identity and access management.

15 Claims, 4 Drawing Sheets

CLOUD BASED TEST DATA MANAGEMENT

BACKGROUND OF THE INVENTION

This application relates generally to test data management and more particularly to a platform for providing test data management in an environment implementing cloud native services.

It is often desirable for information technology developers of an organization to avoid access to production data. For example, general concerns about privacy and security as well as corporate and governmental policies and requirements can render production data access undesirable. At the same time, information technology developers need to engage in meaningful and accurate testing of new systems and software without actually operating on the production data. Test data management involves the generation of non-production data sets that reliably substitute for the production data of an enterprise, to allow for vigorous testing of such new systems and software. Robust test data management thus allows for improved deployments of new systems and software while retaining compliance with privacy and security requirements.

Many organizations have migrated their systems and data into a cloud environment. Additionally, for performance optimization, it is desirable to deploy cloud native services, which are newly developed services specifically designed to operate in the cloud environment, rather than legacy services that are mimicked or hosted within the cloud environment in a layered fashion (e.g., on virtual machines running in the cloud).

Traditional test data management has been implemented using customized platforms specific to each different legacy services environment. It does not have the scalability and resiliency to operate with multiple different cloud native services.

What is needed is a test data management platform for the cloud environment, and which functions with various different cloud native services.

SUMMARY OF THE INVENTION

A test data management platform consistent with at least one embodiment of this disclosure is configured to provide both scheduled and on-demand automated secure data delivery in a cloud native services environment. Various dataset delivery is provided including but not limited to masked and subset datasets. Additionally, the platform is configured to allow user and developer access, particularly in a continuous integration and deployment environment. Still further, the platform interfaces with production data to provision different types of lower environment data, including production-to-lower environment with and without masking, and lower-to-lower environment with and without masking. Additionally, the platform implements security and control features including data governance, data encryption, data masking using security-approved algorithms, logging and monitoring, auditing, scanning credentials, and identity and access management.

According to one aspect of this disclosure, provisioning test data comprises: identifying production data resident in a native cloud services environment; creating a first instance of the production data within a production account, the first instance of the production data being encrypted using a first key; creating a second instance of the production data for access within a first staging account, the second instance of the production data being encrypted using a second key, wherein the first key is not accessible within the first staging account; determining a masking job corresponding to the production data; and executing the masking job within the first staging account to produce a masked version of the production data.

The provisioning of test data may further comprise encrypting the masked version of the production data for access within a second staging account, the masked version of the production data being encrypted using a third key, wherein the second key is not accessible within the second staging account.

The provisioning of test data may further comprise processes wherein, within the second staging account, decrypting the masked version of the production data; and within the second staging account, using a fourth key to encrypt the masked version of the production data for access within a lower environment account, wherein the third key is not accessible within the lower environment account.

The provisioning of test data may further comprise performing testing operations on the masked version of the production data within the lower environment account.

The provisioning of test data may further comprise after performing the testing operations on the masked version of the production data within the lower environment account, deleting the masked version of the production data.

The provisioning of test data may further comprise after performing the testing operations on the masked version of the production data within the lower environment account, deleting the masked version of the production data, the first instance of the production data, and the second instance of the production data.

The present invention can be embodied in and in connection with various forms, including but not limited to business processes, computer implemented methods, computer program products, computer systems and networks, user interfaces, and application programming interfaces.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
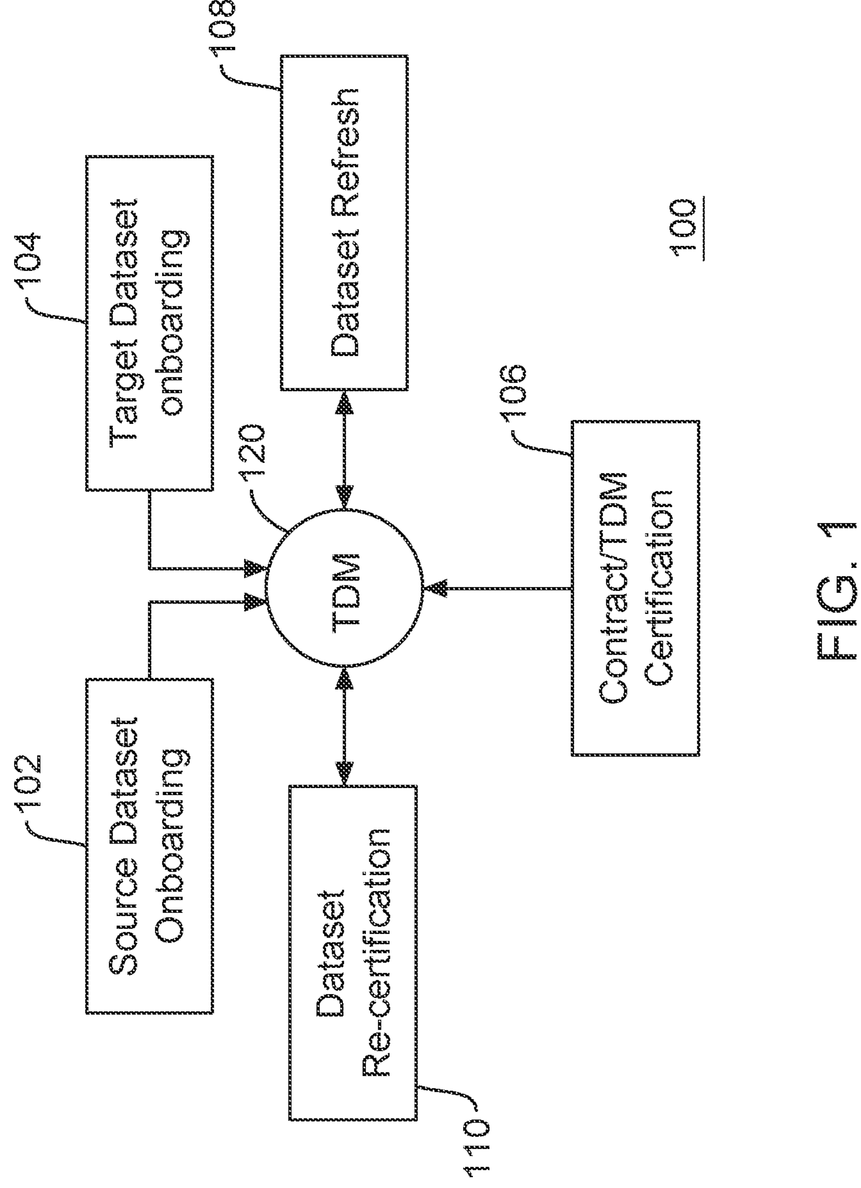
FIG. 1 is a block diagram illustrating an example of a test data management platform and corresponding process flow.

FIG. 1 is a block diagram illustrating an example of a test data management platform 120 and corresponding process flow 100.

In one example, the test data management platform 120 is provided in an Amazon Web Services (AWS) environment.

The test data management platform 120 may also be provided in other environments including Microsoft Azure, IBM Cloud, Oracle Cloud, VMware Cloud, Dell Technologies Cloud, and Alibaba Cloud.

The test data management platform 120 is preferably configured to provide both scheduled and on-demand automated secure data delivery in a cloud native service environment. Various dataset delivery is provided including but not limited to masked and subset datasets. Additionally, the platform 120 is configured to allow user and developer access, particularly in a continuous integration and deployment environment. Still further, the platform 120 interfaces with production data to provision different types of lower environment data, including production-to-lower environment with and without masking, and lower-to-lower environment with and without masking. Additionally, the platform 120 implements security and control features including data governance, data encryption, data masking using security-approved algorithms, logging and monitoring, auditing, scanning credentials and IAM.

The test data management platform 120 is also configured with user interfaces for user and developer access to further an efficient process flow 100 in carrying out the provisioning of the test data in a secure and efficient manner.

At the front end of the process flow 100, source dataset onboarding 102 is carried out. Users and developers access the platform 120 to provide approvals including those from the data owner, as well as entities tasked with approving data privacy, data governance, etc. Additional information as to how test data masking is to be carried out is also collected.

Next, target dataset onboarding 104 is performed. Here, source data owner and target data owner approvals are obtained, and user accesses are further defined. Then the source and target data sets are validated and certified 106.

Following these setup steps, authorized users can initiate a dataset refresh. In case of schema changes in the source dataset that require changes in data masking, the masking configuration can be updated and the dataset re-certified 110.

Figure 2:
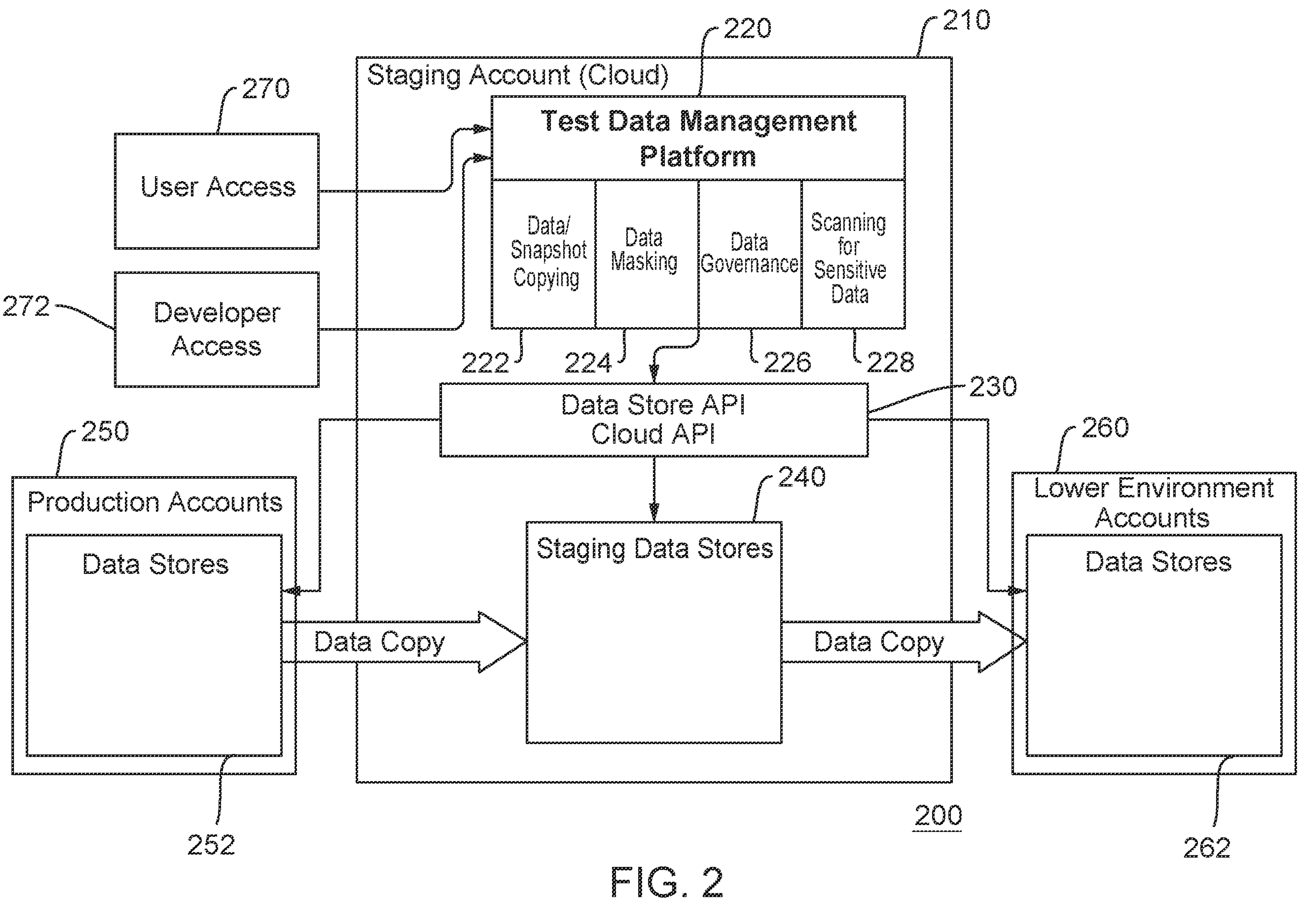
FIG. 2 is a block diagram illustrating an example of a test data management platform in further detail.

FIG. 2 is a block diagram illustrating an example of a test data management platform 220 in further detail. The test data management platform 220 includes modules for performing the functions of data/snapshot copying 222, data masking 224, data governance 226 and scanning for sensitive data 228.

These labels for the test data management platform 220 functional modules are used for ease of discussion. The functions of the test data management platform 220 described herein may be provided using fewer, greater, or differently named modules. Underlying each module is a computing platform that is configured to allow the test data management platform 220 to carry out the described processes and interactions. Where such interactions and processes are described, they are performed by the computing platform, rather than by mental processes. Additionally, the computing platforms respectively include non-transitory computer readable media that store program code. That program code is executable by one or more processors on the respective computing platforms in order to carry out the described processes.

Data snapshot/copying 222 accesses production data and creates copies of the production data in furthering the preparation of test data. Copying may, for example, implement AWS Relational Database Services (RDS), which can be used to take database snapshots.

Data masking 224 applies the configured masking criteria to the production data and manages the corresponding masked data in a production staging account. Data governance ensures that data is properly classified, and all data movements are tracked.

The sensitive date scanning process 228 verifies that no sensitive data is present in a staging dataset before it is copied to non-production environment.

The test data management platform 220 interfaces with user accounts 270 to allow the configuration of data masking requirements, as well as corresponding approvals and certifications to allow the preparation of the test data to go forward. It also interfaces with developer accounts 272 to accommodate the usage of the test data in development processes. All such access is preferably provided in the cloud-based environment.

Production accounts 250 that host production account data stores 252, as well as lower environment accounts 260 that host lower environment data stores 262 are also accessible by and accessed by the test data management platform 220 to carry out appropriate accesses to the various data. A cloud based data store API 230 is preferably used to accommodate such access with the production accounts 250 and the lower environment accounts 260. Staging data stores (production and lower environment) are also managed within the cloud based staging account 210.

Figure 3:
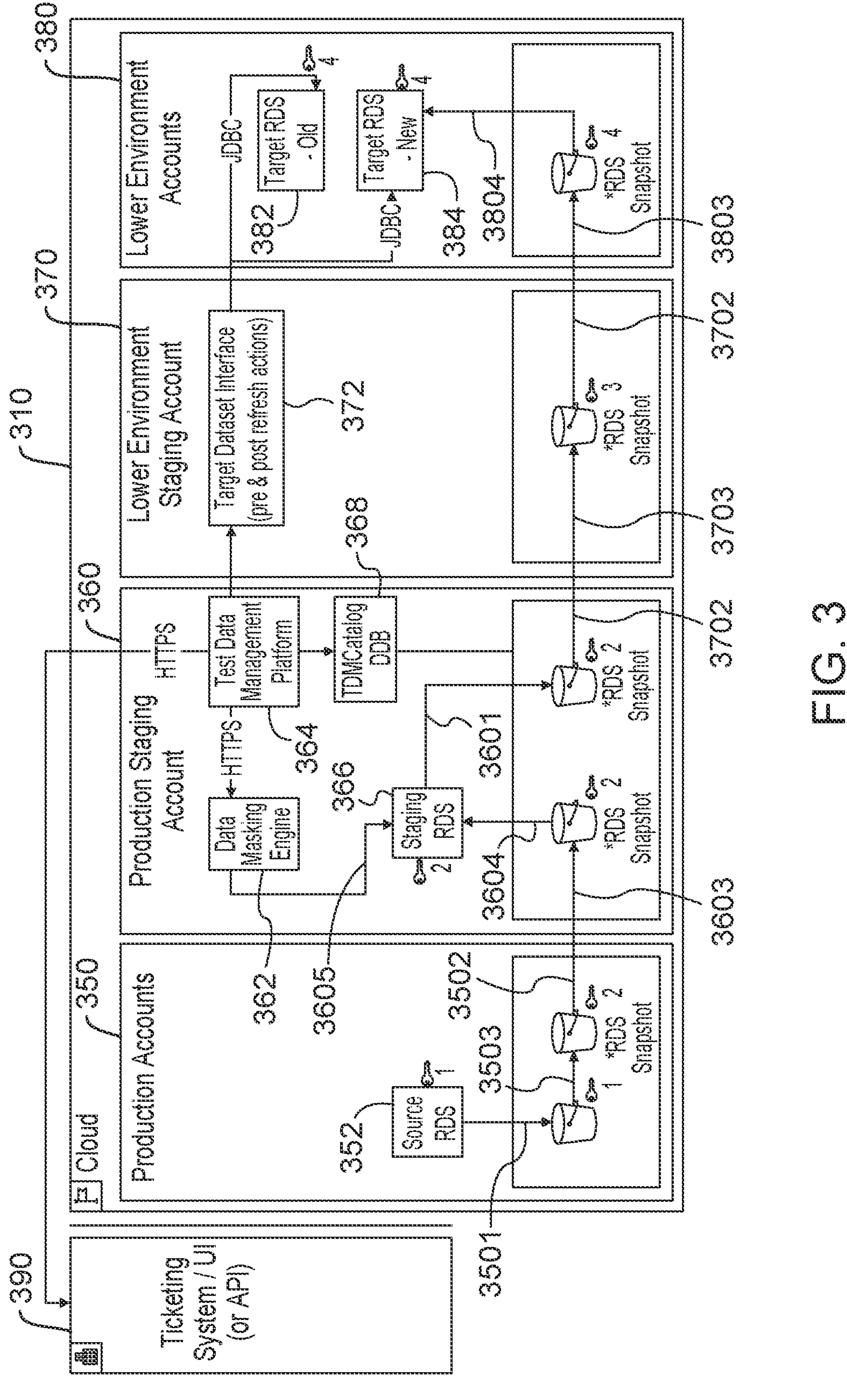
FIG. 3 is a schematic diagram illustrating a test data management platform and corresponding data flow.

FIG. 3 is a schematic diagram illustrating a test data management platform 364 and corresponding data flow in a cloud native services environment 310. Specifically, Production Accounts 350, a Production Staging Account 360, a Lower Environment Staging Account 370 and Lower Environment Accounts 380 are illustrated. These components collectively cooperate to further the data flow in the provision of test data (Target RDS) from production data (Source RDS). In one example, the cloud native services environment 310 is AWS. Additional examples include Microsoft Azure, IBM Cloud, Oracle Cloud, VMware Cloud, Dell Technologies Cloud, and Alibaba Cloud.

A ticketing System UI 390 allows users initiate the request, wherein they indicate the data source and target information. Access to the Test Data Management Platform 364 can also be initiated through an API. The API call can come from various initiation sources. In the former example, the test data management platform 364 periodically polls the ticketing system to see whether there are any tickets ready for processing. In the latter example, the API can directly call the TDMP to put in a request.

The test data management platform 364 creates an encrypted snapshot of Source RDS 352. This snapshot may be created using cloud services and can generally be referred to as a native cloud service snapshot. This is a snapshot of the actual production data, but the snapshot is encrypted using a first key (key 1), even in the production account environment. The initial snapshot creation operation is depicted as Step 3501.

Before the processing pipeline progresses to the next stage (Production Staging Account 360), the initial snapshot of the Source RDS data 352 is decrypted (3503) using the first key 1.

The Test Data Management Platform 364 then re-encrypts (3502) the Source RDS data using a second key 2, and in this same process the encrypted Source RDS data (second key) is shared with the Production Staging Account 360. Thus, a snapshot of the data encrypted using the second key 2 is resident in the Production Staging Account 360, which does not have access to the first key 1. By doing this, the key 1 that is used in the Production Accounts 350 is not used or seen by any other accounts. This enhances the security of the handling of the production data.

Step 3604 illustrates the creation of a new RDS instance, referred to as the Staging RDS 366. This allows masking operations to be performed on the Staging RDS 366 within the Production Staging Account 360. Sensitive data for which access is to be prevented in the local environments is masked (3605) by the data masking engine 362. The data masking engine 362 also has access to key 2, to accommodate decryption to perform the masking operations.

The data masking engine 362 includes information specifying which fields in a particular database are to be masked, as well as how they should be masked. The set of masking algorithms for a particular DB may be referred to as a masking job. The data masking engine 362 includes the information specifying the fields, as well as routines for carrying out the masking operations.

In terms of process flow, the test data management platform 364 calls an API in the data masking engine 262 and initiates the execution of the masking job (e.g., HTTPS). TDM catalog DDB 368 a database where configuration data is stored. It is the operational data for the TDMP.

Once the masking job is completed, the data is instantiated for further access in the Lower Environment Staging Account. Step 3601 indicates the creation of a snapshot of the masked, encrypted data. This snapshot may also be encrypted using the second key 2. However, access to the second key 2 is restricted to the Production Staging Account 360.

In step 3703, another RDS snapshot instance is created, and it is encrypted using a third key 3. Similarly, the decryption 3702 and encryption 3703 to share the data may be performed in the same process step. The third key is used to decrypt 3702 the staged data. The staged data is then re-encrypted 3803 using a fourth key 4 used within the Lower Environment Accounts 380. Again, the decrypt 3702 and encrypt 3803 operations may be performed within one operation that is performed by a call to a relational database service.

The existing Target RDS 382 is renamed by adding a suffix so that the new Target RDS 384 can use the original Target RDS name. The Target RDS 384 is created by taking a snapshot (3804) within the Lower Environment Accounts 380. The Target Dataset Interface 372 manages access control for the users. It extracts users from the old database 382 and applies them into the new database 384, so that the users are the same.

At this point the Target RDS data is fully prepared for performing any desired testing operations within the Lower Environment Accounts 380.

Once the user access is completed, all of the snapshots in the Production Accounts 350, Production Staging Account 360, Lower Environment Staging Account 370 and Lower Environment Accounts 380 are preferably deleted.

Figure 4:
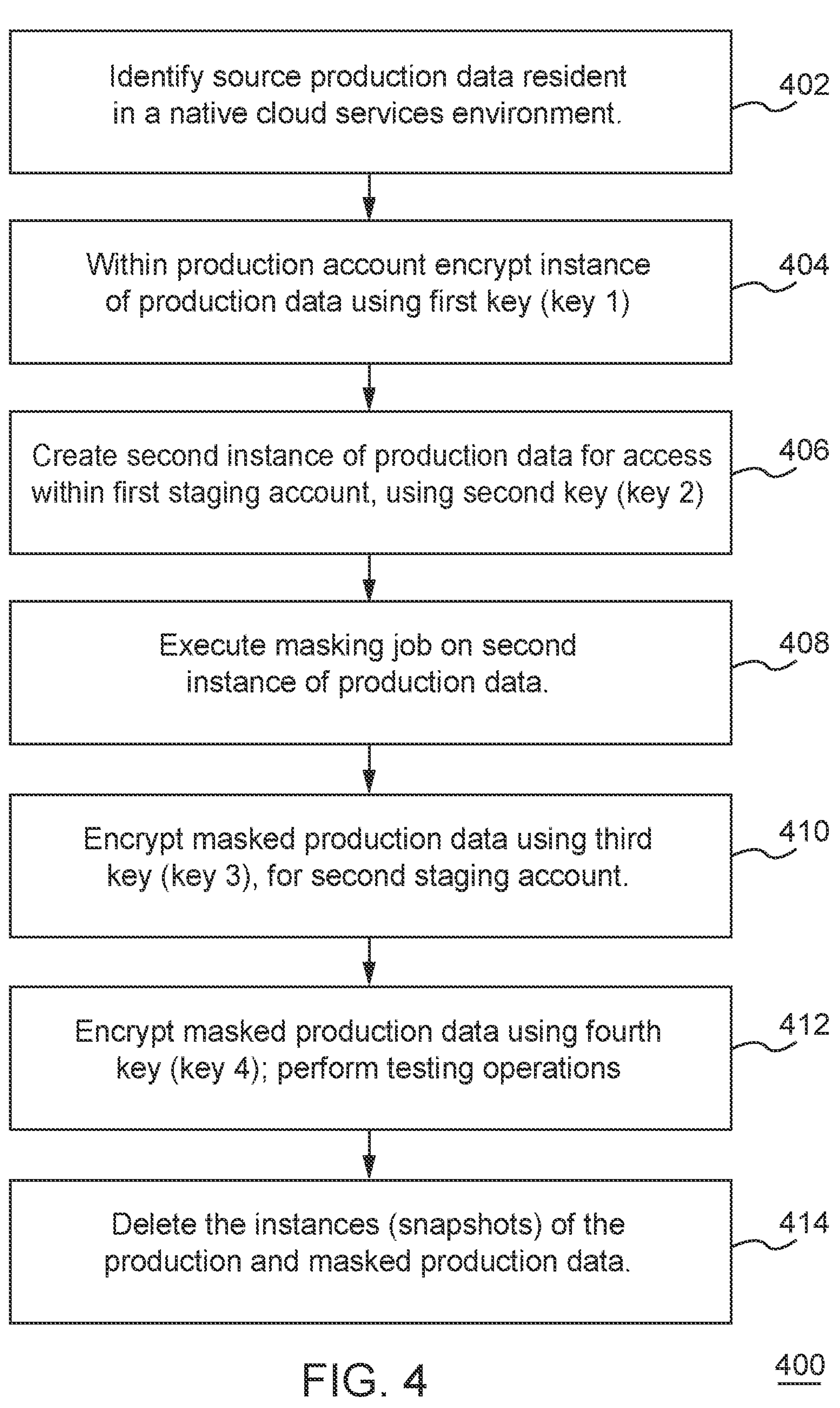
FIG. 4 is a flow diagram illustrating an example of performing the provisioning of test data.

FIG. 4 is a flow diagram illustrating an example of a process for performing the provisioning of test data 400. The process initiates with identifying 402 production data resident in a native cloud services environment. This is the Source RDS data that the end user wishes to perform test operations upon. It requires masking by the test data management platform to allow appropriate user access. The masked data is referred to as Target RDS data.

Initially, a first instance of the production data is created 404 within a production account. The first instance of the production data is encrypted using a first key that is preferably only available or accessible within the production account.

Then, a second instance of the production data is created 406, for access within a first staging account. This second instance of the production data is encrypted using a second key. The first staging account does not have access to the first key. The first staging account uses only the second key, which is used to protect the data within the first staging account.

Next, the process determines 408 a masking job corresponding to the production data, and executes the masking job within the first staging account to produce a masked version of the production data. Particular databases have various masking criteria to be applied to accommodate access to the remaining masked data for various testing operations. For example, sensitive user information or the like is masked by removing those fields or replacing them with unidentifiable information. The set of criteria can be referred to as a masking job.

A second staging account may also be used. There, the process encrypts 410 the masked version of the production data for access within the second staging account. This time, the masked version of the production data is encrypted using a third key, wherein the second key is not accessible within the second staging account.

The masked data is thus fully staged for access within a lower environment account (i.e., the account wherein the testing is to be performed). Here, within the second staging account, the masked version of the production data is decrypted using the third key, and then a fourth key is used to encrypt the masked version of the production data for access within a lower environment account. Then, the testing is performed in the lower environment account. The third key is preferably not accessible within the lower environment account (412).

After performing the testing operations on the masked version of the production data within the lower environment account, the process concludes by deleting 414 the masked version of the production data, the first instance of the production data, and the second instance of the production data.

While this disclosure includes references to illustrative embodiments, this specification is not intended to be construed in a limiting sense. Various modifications of the described embodiments, as well as other embodiments within the scope of the disclosure, which are apparent to persons of ordinary skill in the art to which the disclosure pertains are deemed to lie within the scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature and principles of this disclosure may be made by those skilled in the pertinent art without departing from the scope of the disclosure, e.g., as expressed in the following claims.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on. Similarly, while some of the figures show different layers as horizontal layers such orientation is for descriptive purpose only and not to be construed as a limitation.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure.

Thus, embodiments of the present invention produce and provide methods and apparatuses for data access provisioning. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for provisioning test data in a native cloud services environment, the method comprising:

identifying production data resident in the native cloud services environment;

creating a first instance of the production data within a production account of the native cloud services environment, the first instance of the production data being encrypted using a first encryption key that is managed by a key management service (KMS) of the production account;

creating a second instance of the production data for access within a first staging account that is different from the production account, the second instance of the production data being encrypted using a second encryption key that is managed by a KMS of the first staging account, wherein, by account policy and KMS configuration, the first encryption key is not accessible within the first staging account and cryptographic material for the first instance is not exportable to the first staging account;

determining a masking job corresponding to the production data; and executing the masking job within the first staging account while the second instance remains encrypted under the second encryption key, to produce a masked version of the production data;

encrypting the masked version of the production data for access within a second staging account, the masked version of the production data being encrypted using a third encryption key, wherein the second encryption key is not accessible within the second staging account;

within the second staging account, decrypting the masked version of the production data; and within the second staging account, using a fourth encryption key to encrypt the masked version of the production data for access within a lower environment account, wherein the third encryption key is not accessible within the lower environment account.

2. The method for provisioning test data according to claim 1, further comprising:

performing testing operations on the masked version of the production data within the lower environment account.

3. The method for provisioning test data according to claim 2, further comprising:

after performing the testing operations on the masked version of the production data within the lower environment account, deleting the masked version of the production data.

4. The method for provisioning test data according to claim 2, further comprising:

after performing the testing operations on the masked version of the production data within the lower environment account, deleting the masked version of the production data, the first instance of the production data, and the second instance of the production data.

5. A non-transitory computer readable medium storing program code for provisioning test data in a native cloud services environment, the program code being executable by a processor to perform operations comprising:

identifying production data resident in the native cloud services environment;

creating a first instance of the production data within a production account of the native cloud services environment, the first instance of the production data being encrypted using a first encryption key that is managed by a key management service (KMS) of the production account;

creating a second instance of the production data for access within a first staging account that is different from the production account, the second instance of the production data being encrypted using a second encryption key that is managed by a KMS of the first staging account, wherein, by account policy and KMS configuration, the first encryption key is not accessible within the first staging account and cryptographic material for the first instance is not exportable to the first staging account;

determining a masking job corresponding to the production data; and executing the masking job within the first staging account while the second instance remains encrypted under the second encryption key, to produce a masked version of the production data;

encrypting the masked version of the production data for access within a second staging account, the masked version of the production data being encrypted using a third encryption key, wherein the second encryption key is not accessible within the second staging account;

within the second staging account, decrypting the masked version of the production data; and within the second staging account, using a fourth encryption key to encrypt the masked version of the production data for access within a lower environment account, wherein the third encryption key is not accessible within the lower environment account.

6. The non-transitory computer readable medium according to claim 5, wherein the operations further comprise:

performing testing operations on the masked version of the production data within the lower environment account.

7. The non-transitory computer readable medium according to claim 6, wherein the operations further comprise:

after performing the testing operations on the masked version of the production data within the lower environment account, deleting the masked version of the production data.

8. The non-transitory computer readable medium according to claim 6, wherein the operations further comprise:

after performing the testing operations on the masked version of the production data within the lower environment account, deleting the masked version of the production data, the first instance of the production data, and the second instance of the production data.

9. An apparatus for provisioning test data in a native cloud services environment, the apparatus comprising:

a memory storing program code, and a processor configured to execute the program code to perform operations comprising:

identifying production data resident in the native cloud services environment;

creating a first instance of the production data within a production account of the native cloud services environment, the first instance of the production data being encrypted using a first encryption key that is managed by a key management service (KMS) of the production account;

creating a second instance of the production data for access within a first staging account that is different from the production account, the second instance of the production data being encrypted using a second encryption key that is managed by a KMS of the first staging account, wherein, by account policy and KMS configuration, the first encryption key is not accessible within the first staging account and cryptographic material for the first instance is not exportable to the first staging account;

determining a masking job corresponding to the production data; and executing the masking job within the first staging account while the second instance remains encrypted under the second encryption key, to produce a masked version of the production data;

encrypting the masked version of the production data for access within a second staging account, the masked version of the production data being encrypted using a third encryption key, wherein the second encryption key is not accessible within the second staging account;

within the second staging account, decrypting the masked version of the production data; and within the second staging account, using a fourth encryption key to encrypt the masked version of the production data for access within a lower environment account, wherein the third encryption key is not accessible within the lower environment account.

10. The apparatus according to claim 9, wherein the operations further comprise:

performing testing operations on the masked version of the production data within the lower environment account.

11. The apparatus according to claim 10, wherein the operations further comprise:

after performing the testing operations on the masked version of the production data within the lower environment account, deleting the masked version of the production data.

12. The apparatus according to claim 10, wherein the operations further comprise:

after performing the testing operations on the masked version of the production data within the lower environment account, deleting the masked version of the production data, the first instance of the production data, and the second instance of the production data.

13. The method according to claim 1, wherein the first encryption key is generated, stored, and managed exclusively by the key management service of the production account, and cryptographic material associated with the first encryption key is non-exportable from the production account by policy enforced by the key management service.

14. The non-transitory computer readable medium according to claim 5, wherein the first encryption key is generated, stored, and managed exclusively by the key management service of the production account, and cryptographic material associated with the first encryption key is non-exportable from the production account by policy enforced by the key management service.

15. The apparatus according to claim 9, wherein the first encryption key is generated, stored, and managed exclusively by the key management service of the production account, and cryptographic material associated with the first encryption key is non-exportable from the production account by policy enforced by the key management service.

* * * * *